(12) United States Patent
Chen

(10) Patent No.: US 7,270,559 B1
(45) Date of Patent: Sep. 18, 2007

(54) ELECTRICAL CARD CONNECTOR INCLUDING A LOCKING MECHANISM

(75) Inventor: Cheng-Yi Chen, Chung Ho (TW)

(73) Assignee: Jess-Link Products Co., Ltd., Taipei County (TW)

( * ) Notice: Subject to any disclaimer, the term of this patent is extended or adjusted under 35 U.S.C. 154(b) by 0 days.

(21) Appl. No.: 11/598,160

(22) Filed: Nov. 9, 2006

(51) Int. Cl.
*H01R 13/62* (2006.01)

(52) U.S. Cl. .................. 439/326; 439/331; 439/630

(58) Field of Classification Search ............ 439/326, 439/331, 360, 945
See application file for complete search history.

(56) References Cited

U.S. PATENT DOCUMENTS

| | | | |
|---|---|---|---|
| 5,996,891 A * | 12/1999 | Braun | 235/441 |
| 6,884,102 B2 * | 4/2005 | Rumpel et al. | 439/331 |
| 7,118,419 B1 * | 10/2006 | Lee | 439/630 |
| 7,160,129 B2 * | 1/2007 | Yin | 439/331 |

* cited by examiner

*Primary Examiner*—Hae Moon Hyeon
(74) *Attorney, Agent, or Firm*—Rosenberg, Klein & Lee

(57) ABSTRACT

An electrical connector includes an insulating body, and a shell body. The insulating body includes a body, pivoting concave ditches located at two sides of end of the body and formed along horizontal directions, and circular rotating angles located at the top rim of the two sides of the end of the body. The body receives a plurality of conducting pins. The shell body includes a top wall, side walls, pivoting convex columns, and a blocking element. The pivoting convex column is located in the pivoting concave ditch. By moving the pivoting convex column in the pivoting concave ditch, the shell body moves. By contacting the blocking element with the arc of the circular rotating angle, when the shell body rotates to a specified angle with the insulting body, the shell body moves along the side wall of the shell body.

12 Claims, 8 Drawing Sheets

US 7,270,559 B1

ELECTRICAL CARD CONNECTOR INCLUDING A LOCKING MECHANISM

BACKGROUND OF THE INVENTION

1. Field of the Invention

The present invention relates to an electrical connector. In particular, this invention relates to an electrical connector that is applied in information and communication devices.

2. Description of the Related Art

As information technology has developed and progressed, personal information and communication devices (such as cell phones or personal computers) have become more and more popular. Furthermore, as communication and Internet technology has changed with each passing day, cell phones have become the most popular communication tool. A SIM card in a cell phone is used for identifying the user when they electrically connect with the circuit board via a connector.

Reference is made to FIG. 1, which shows a perspective view of the connector of the prior art. The connector includes an upper cover 60a, and a contacting-point module 62a. The upper cover 60a includes a metal cover body 600a, and clipping arms 601a located at two sides of the metal cover body 600a. At one end of the clipping arm 601a, there is a wedge 602a. At another end of the clipping arm 601a, there is a pivoting shaft 603a. The contacting-point module 62a includes an insulating body 620a, and a plurality of conducting pins 621a. At one end of the insulating body 620a, there is a locking part 622a that is wedged and locked with the upper cover 60a. At the opposite end, there is a pivoting hole (not shown in the figure) that matches the pivoting shaft 603a of the clipping arm 601. After the SIM card (not shown in the figure) is plugged into the upper cover 60a, the upper cover 60a is rotated to make the wedge 602a be wedged and held with the locking part 622a of the contacting-point module 62a. Thereby, the SIM card is connected with the circuit board (not shown in the figure). The upper cover 60a of the connector is wedged and held with the contacting-point module 62a by simply matching the wedge 602a and the locking part 622a.

However, the holding method of the connector of the prior art is simple and the holding force is small. When an external factor (such as a strike) is exerted on the connector, the upper cover 60a is easily separated from the contacting-point module. Therefore, the SIM card cannot contact the conducting pins well. The connector of the prior art cannot meet the required quality of the information and communication devices.

SUMMARY OF THE INVENTION

One particular aspect of the present invention is to provide an electrical connector that includes a locking element on the shell body. The locking element fits with locking structure located on the insulating body so as to make the shell body be firmly locked with the insulating body. The present invention also has a flexible-locking part on the insulating body. By fitting the conducting metal flake located on the flexible-locking part with the locking element, the shell body is locked with the insulating body and has a grounding effect.

Furthermore, the present invention has a pivoting concave ditch on the insulating body and has a blocking element on the shell body, and the pivoting concave ditch matches the blocking element to produce a blocking effect which prevents the shell body from being rotated outward and damaging the structure of the shell body. Moreover, the shell body has a convex point. When the shell body is locked with the insulating body, the grounding is good via contacting the convex point with the flexible-locking structure.

The electrical connector includes an insulating body, and a shell body. The insulating body includes a body, pivoting concave ditches located at two sides of the end of the body and formed along in a horizontal direction, and circular rotating angles located at a top rim of the two sides of the end of the body. The body receives a plurality of conducting pins. The shell body includes a top wall, side walls formed at the sides of the top wall, pivoting convex columns respectively formed at the end of the two sides of the side wall and facing inward, and a blocking element located at the top rim of one of the side walls and contacting the circular rotating angle. The pivoting convex column is located in the pivoting concave ditch. By moving the pivoting convex column in the pivoting concave ditch, the shell body is covered onto the insulating body, and is opened from the insulating body.

By contacting the blocking element with the arc of the circular rotating angle, when the shell body rotates to a specified angle with the insulting body, the shell body still moves in the insulating body. The shell body does not rotate to the outside of the insulating body and damage the structure of the shell body. Furthermore, there is a convex point on the shell body so that the connector is grounded well by contacting the convex point with the flexible-locking structure when the shell body is locked onto the insulating body.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
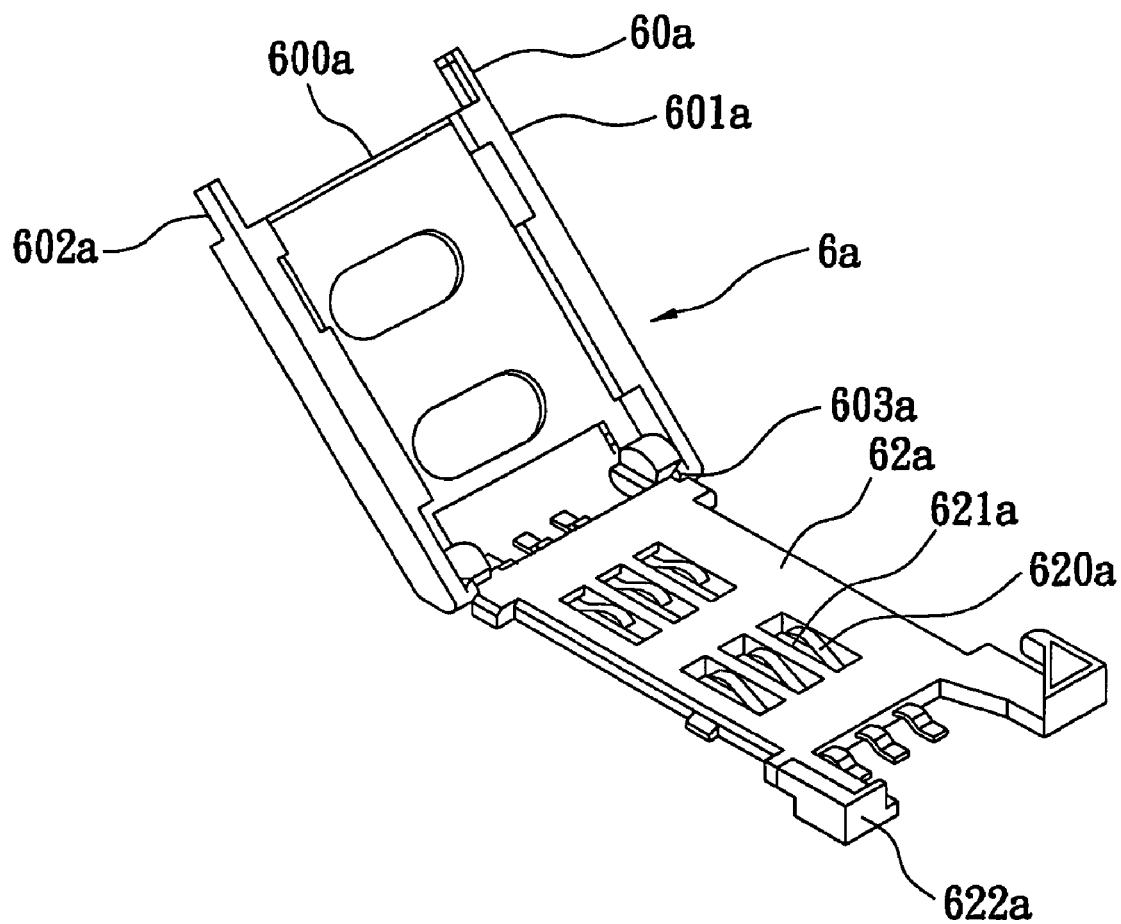
FIG. 1 is a perspective view of the electrical connector of the prior art.
Figure 2:
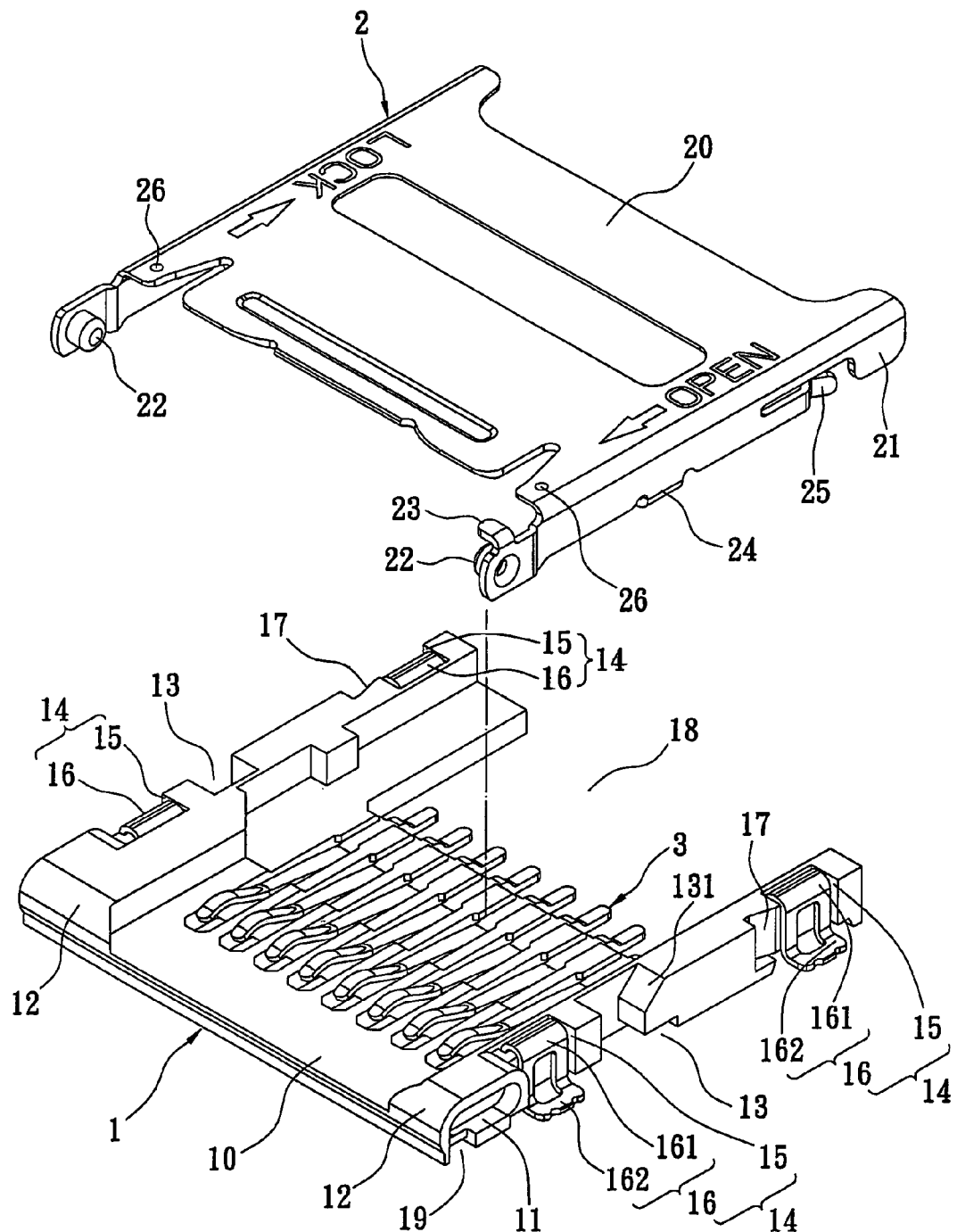
FIG. 2 is an exploded perspective view of the electrical connector of the present invention.

Reference is made to FIG. 2, which shows an exploded perspective view of the electrical connector of the present invention. The electrical connector includes an insulating body 1 and a shell body 2.

The electrical connector includes an insulating body, and a shell body. The insulating body includes a body, pivoting concave ditches 11 located at two sides of end of the body 10 and formed along the horizontal direction, and circular rotating angles 12 located at a top rim of two sides of the end of the body 10. The body 10 receives a plurality of conducting pins 3.

The shell body 2 includes a top wall 20, side walls 21 formed at sides of the top wall 20, pivoting convex columns 22 respectively formed at the end of the two sides of the side wall 21 and facing inward, and a blocking element 23 located at a top rim of one of the side walls 21 and contacting the circular rotating angle 12.

The insulating body 1 further includes a locking part 13 and a guiding angle 131 respectively located at two sides of the body 10. The shell body 2 further includes locking elements respectively formed from the bottom rims of the side wall 21 and facing inward. The locking elements 24 are locked with the locking parts 13. The guiding angle 131 guides the locking element 24 to lock with the locking part 13. When a user covers the shell body 2 onto the insulating body 1, the guiding angle 131 is used for guiding the shell body 2 so that the pivoting convex column 22 pressing and damaging the concave ditch 11 of the insulting body 1 is avoided when the shell body 2 inexactly covers the insulating body 1. Moreover, the insulating body 1 further includes flexible-locking sets 14 that are located at two sides of the body 10 and are adjacent to the front end and the rear end of the body 10. The flexible-locking set 14 has a flexible-locking ditch 15 located on the body 10, and a metal conducting flake 16 fastened on the flexible-locking ditch 15. The metal conducting flake 16 has a fixing part 161 fastened on the flexible-locking ditch 15, and a soldering part 162 extending from the fixing part 161. The shell body 2 further includes flexible-locking elements 25 respectively located at the side walls 21. The flexible-locking elements 25 elastically lock with the fixing parts 161 (utilizing the convex part of the flexible-locking element 25 to lock the concave part of the fixing part 161). The soldering part 162 is soldered onto a circuit board (not shown in the figure) via a soldering method.

The shell body 2 further includes convex points 26 respectively located at a top wall 20 and adjacent to the side walls 21. When the shell body 2 is covered, the convex points 26 contact the fixing parts 161 and generate a grounding effect via the soldering part 162. The insulating body 1 further includes inclined guiding slots 17 respectively located at two sides of the body 10. The inclined guiding slot 17 is formed from the front end of the body 10 to the rear end of the body 10. Moreover, the insulating body 1 further includes guiding openings 19 respectively located at two sides of the end of the body 10 and introduced to the pivoting concave ditch 11. When the electrical connector is assembled, the pivoting convex column 22 of the shell body 2 is placed into the pivoting concave ditch 11 via the guiding opening 19.

Thereby, when the shell body 2 is rotated 180 degrees (the shell body 2 and the insulating body 1 are located on a straight line), the shell body 2 cannot move forwards or backwards in the concave ditch 11. By locking the locking elements 24 with the locking parts 13 and elastically locking the flexible-locking element 25 with the fixing part 161, the shell body 2 is tightly locked on the insulating body 1. Due to a pivoting concave ditch 11 in the insulating body 1 and a blocking element 23 in the shell body 2, the shell body 2 cannot be rotated excessively thus avoiding any damage being caused to the shell body's 2 structure.

The insulating body 1 further includes a receiving space 18 in the body 10. The receiving space 18 is used for receiving a memory card (not shown in the figure), such as a SM card, a MS card, a Mini card, a Micro-SD card, or a T-flash card, etc.

Figure 3:
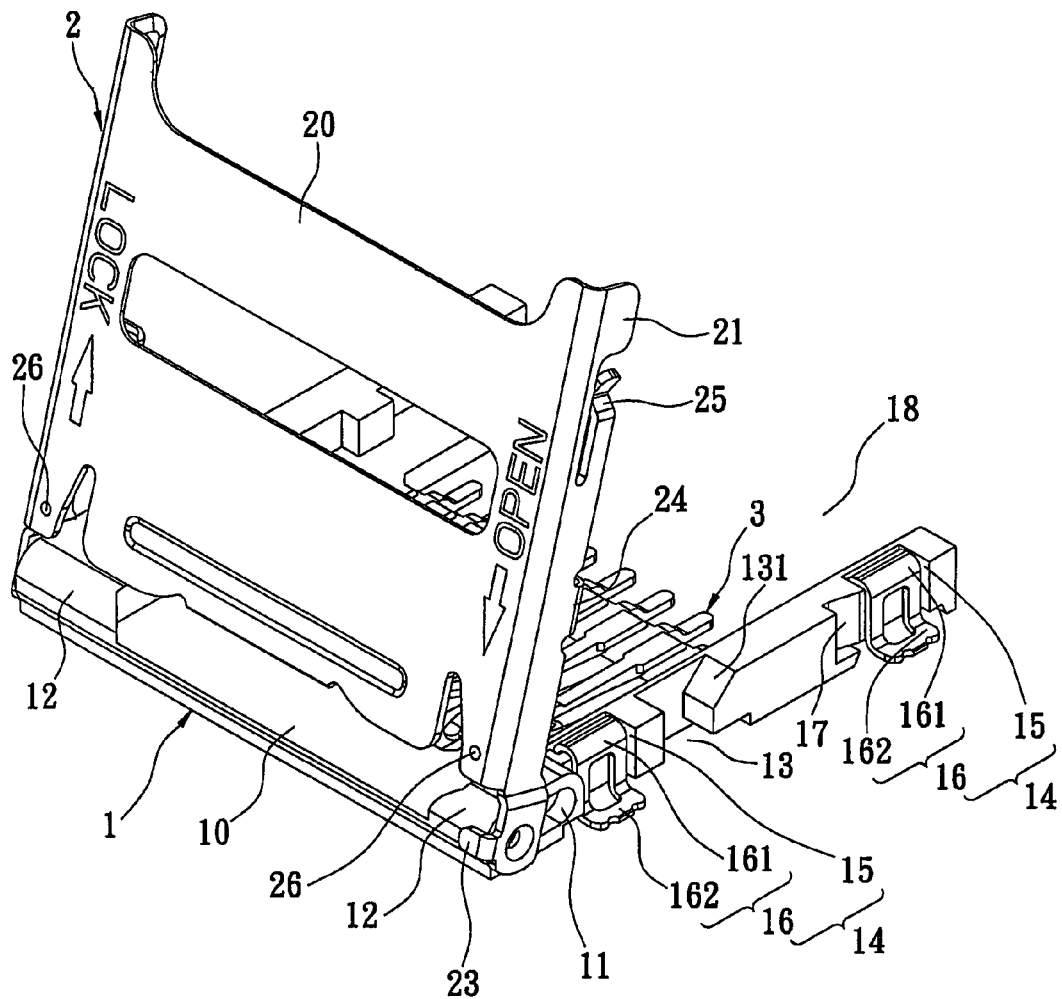
FIG. 3 is a perspective view of the electrical connector of the present invention being open.
Figure 6:
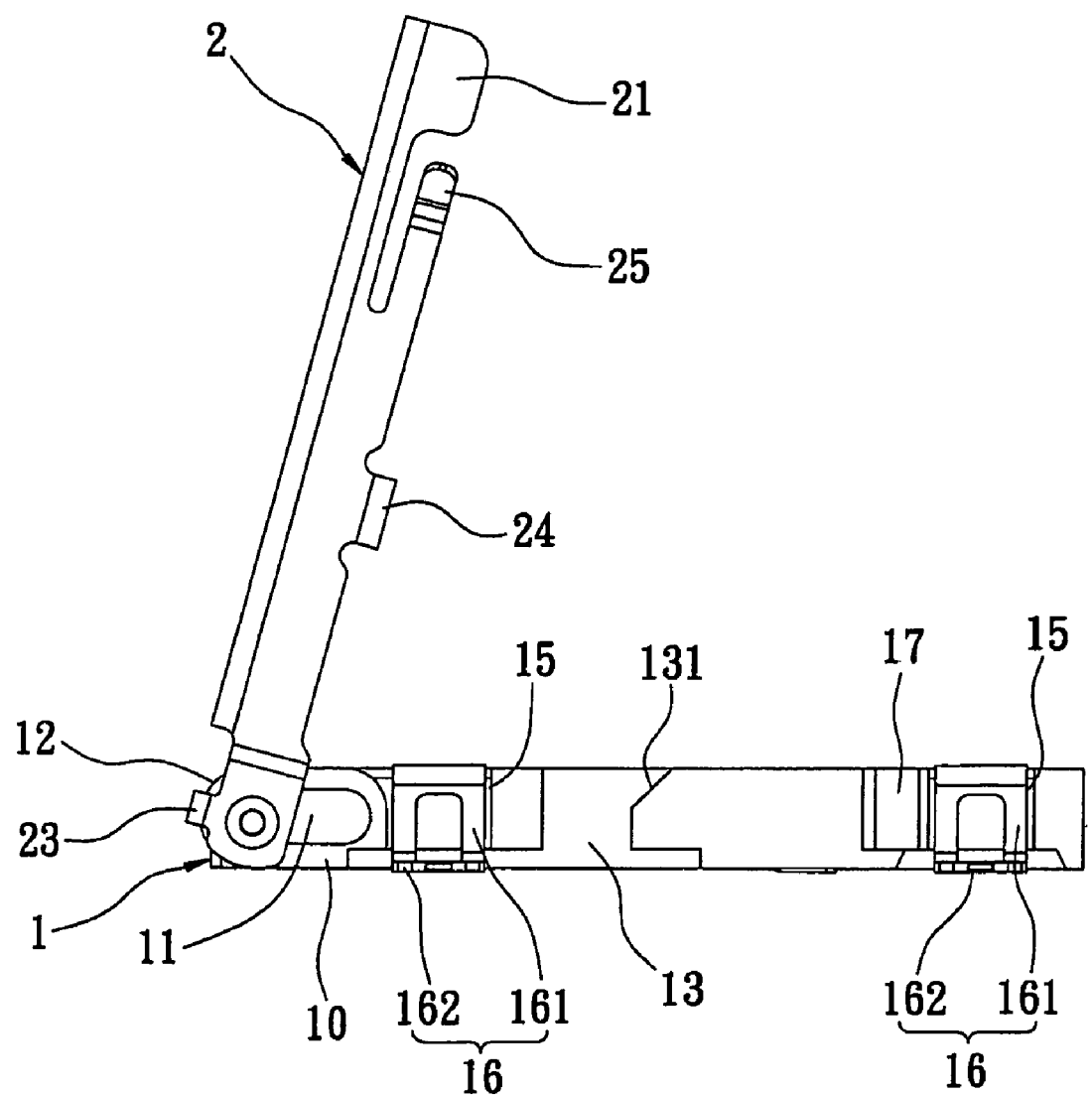
FIG. 6 is a side view of the electrical connector of FIG. 3.

Reference is made to FIGS. 3 and 6, which show a perspective view and a side view of the electrical connector of the present invention being open. The pivoting convex column 22 (in FIG. 2) of the shell body 2 is placed in the pivoting concave ditch via the guiding opening 19 (in FIG. 2) and is assembled with the insulating body 1. When the electrical connector is opened, a memory card (not shown in the figure) can be placed in the shell body 2. The shell body 2 rotates and contacts the arc of the circular rotating angle 12 via the blocking element 23. When the shell body 2 is rotated to a specified angle, the shell body 2 moves along a surface of the insulating body 1 that contacts the shell body 2.

Figure 4:
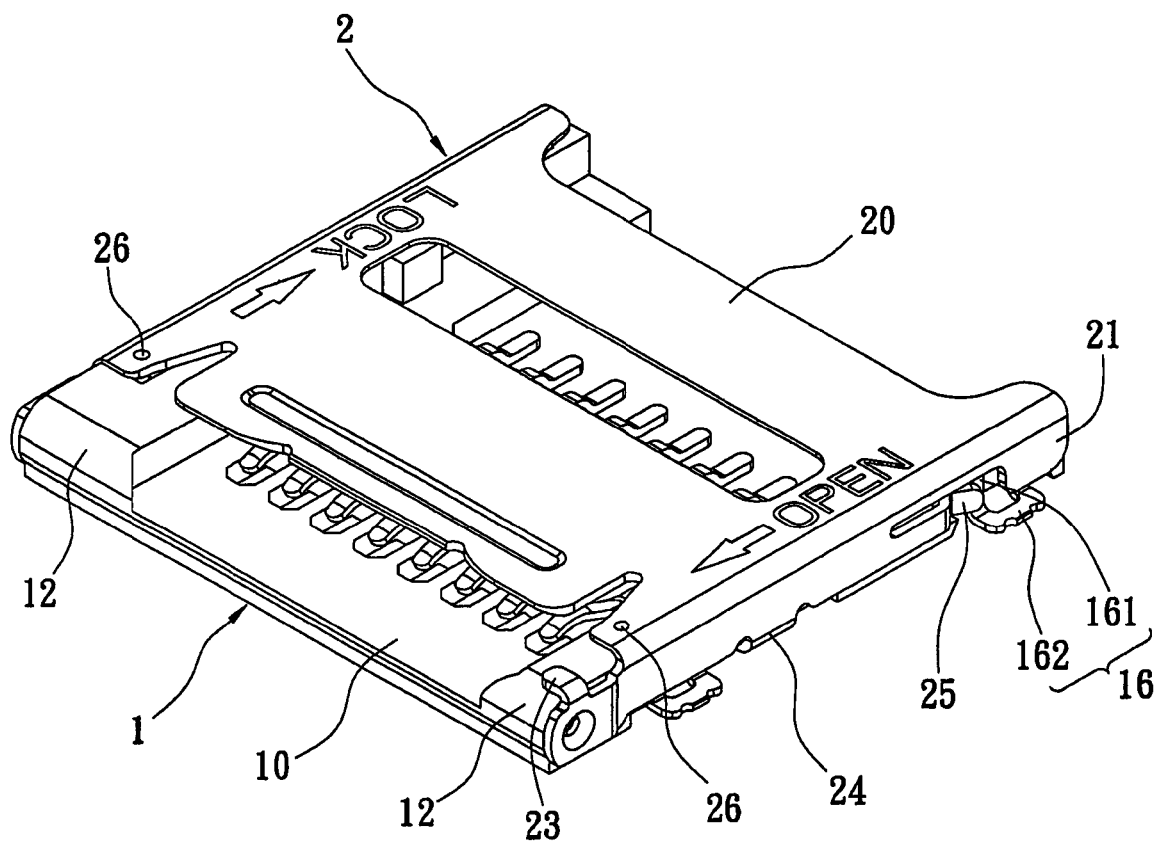
FIG. 4 is a perspective view of the electrical connector of the present invention being covered and unlocked.
Figure 5:
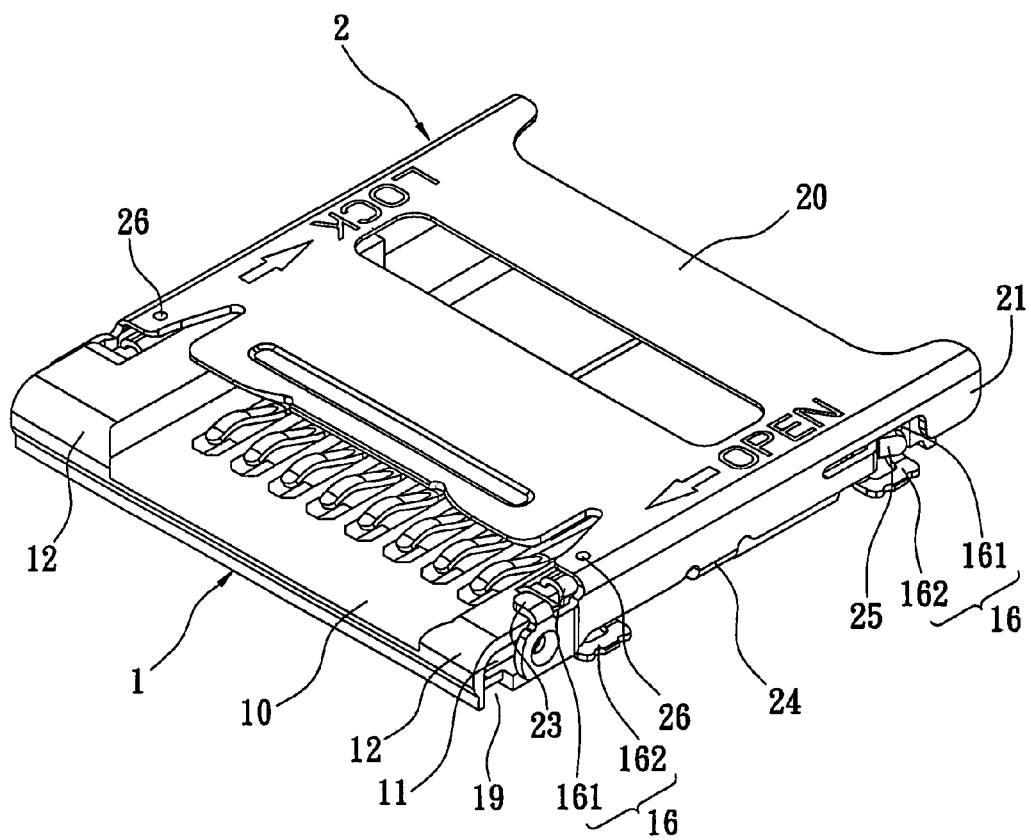
FIG. 5 is a perspective view of the electrical connector of the present invention being covered and locked.
Figure 7:
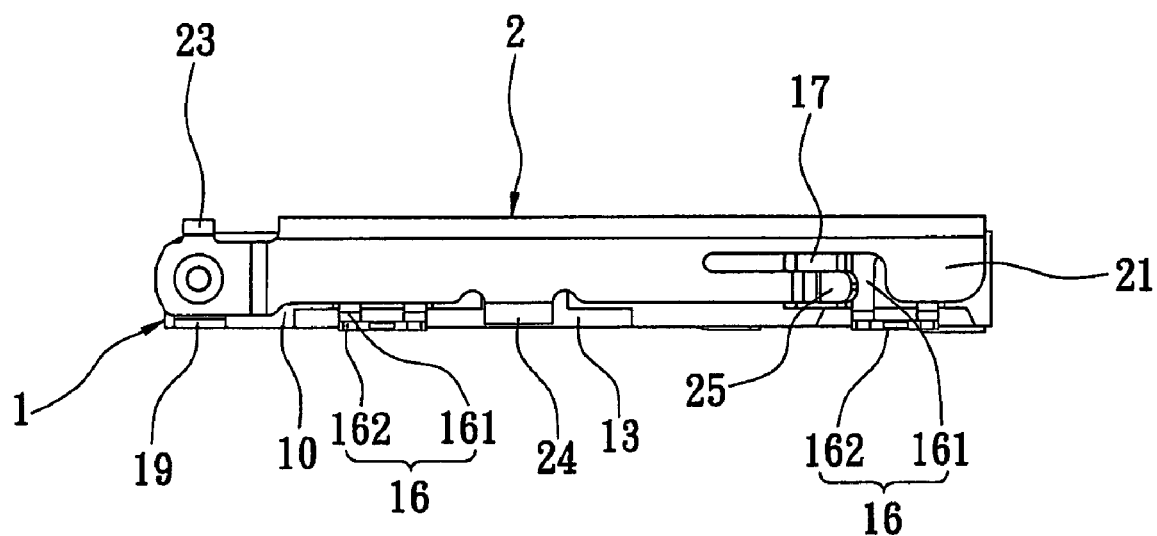
FIG. 7 is a side view of the electrical connector of FIG. 4.
Figure 8:
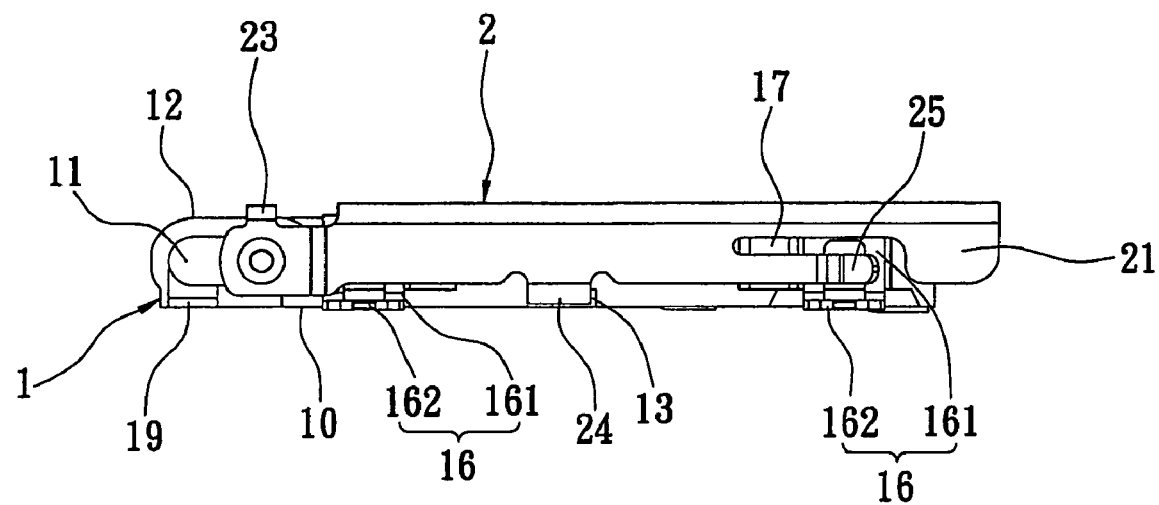
FIG. 8 is a side view of the electrical connector of FIG. 5.

Reference is made to FIGS. 4, 5, 7 and 8, which show the electrical connector of the present invention when it is covered and unlocked, and covered and locked. The pivoting convex column 22 is located in the pivoting concave slot. The shell body 2 moves horizontally forwards and backwards in the pivoting concave ditch 11 via the pivoting convex column 22 so that the shell body 2 is unlocked from the insulating body 1 (FIGS. 4 and 7), or locked with the insulating body 1 (FIGS. 5 and 8). When the shell body 2 is unlocked (as shown in FIGS. 4 and 7), the locking element 24 is not locked with the locking part 13, the flexible-locking element 25 is located in the inclined guiding slot 17, and the convex point 26 does not contact the metal conducting flake 16. When the shell body 2 is locked (as shown in FIGS. 5 and 8), the locking element 24 moves into the locking part 13 and locks with the locking part 13, the flexible-locking element 25 moves into the fixing part 161 and elastically locks with the fixing part 161 (utilizing the convex part of the flexible-locking element 25 to lock the concave part of the fixing part 161), and the convex point 26 contacts the metal conducting flake 16. The electrical connector is soldered onto a circuit board (not shown in the figure) via the soldering part 162 to achieve the grounding effect.

The electrical connector of the present invention has the pivoting concave ditch 11, the circular rotating angle 12 and flexible-locking set 14 in the insulating body 1, and cooperates with the flexible-locking element 25 and the blocking element 23 in the shell body 2. The present invention has the following characteristics:

1. By utilizing the function provided by the blocking element 23, the shell body does not rotate excessively thus avoiding any damage being caused to the shell body 2 when the shell body 2 is opened.

2. By utilizing the function provided by the blocking element 23 and the pivoting concave ditch, the shell body 2 is not easily taken from insulating body 1 when the shell body 2 is covered and unlocked.

3. The design of the flexible-locking element is simple so that it is easily manufactured and achieves the locking and grounding effect.

4. By designing the simple structures for the pivoting concave ditch 11, the blocking element 23 and the circular rotating angle 12, the shell body 2 can rotate both freely and restrictedly.

5. Because the diameter of the pivoting convex column 22 is designed to match the dimensions of the pivoting concave ditch, the strength of the pivoting convex column 22 is substantially enhanced.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An electrical connector, comprising:
   an insulating body having a body, pivoting concave ditches located at two sides of an end of the body and formed along a horizontal direction, and circular rotating angles located at a top rim of the two sides of the end of the body, wherein the body receives a plurality of conducting pins; and
   a shell body having a top wall, side walls respectively formed each side of the top wall, pivoting convex columns respectively formed at the end of the two sides of the side wall and facing inward, and a blocking element located at the top rim of one of the side walls and contacting the circular rotating angle;
   wherein the pivoting convex column is located in the pivoting concave ditch, the shell body covers the insulating body, or is opened from the insulating body by moving the pivoting convex column in the pivoting concave ditch; thereby, when the shell body rotates to a specified angle with the insulting body, the shell body still moves in the insulating body by contacting the blocking element with the arc of the circular rotating angle.

2. The electrical connector as claimed in claim 1, wherein the insulating body further comprises flexible-locking sets that are located at two sides of the body and are adjacent to the front end and the rear end of the body.

3. The electrical connector as claimed in claim 2, wherein the flexible-locking set has a flexible-locking ditch located on the body, and a metal conducting flake fastened on the flexible-locking ditch.

4. The electrical connector as claimed in claim 3, wherein the metal conducting flake has a fixing part fastened on the flexible-locking ditch, and a soldering part extending from the fixing part.

5. The electrical connector as claimed in claim 4, wherein the shell body further comprises flexible-locking elements respectively located at the side walls, and the flexible-locking elements elastically lock with the fixing parts.

6. The electrical connector as claimed in claim 4, wherein the shell body further comprises convex points respectively located at a top wall and adjacent to the side walls, the convex points contact the fixing parts when the shell body is covered.

7. The electrical connector as claimed in claim 1, wherein the insulating body further comprises inclined guiding slots respectively located at two sides of the body, and the inclined guiding slots are formed from the front end of the body to the rear end of the body.

8. The electrical connector as claimed in claim 1, wherein the insulating body further comprises guiding openings respectively located at two sides of the end of the body and introduced to the pivoting concave ditch.

9. The electrical connector as claimed in claim 7, wherein the insulating body further comprises guiding openings respectively located between two sides of the end of the body and the inclined guiding slot, and the guiding openings are introduced to the pivoting concave ditch.

10. The electrical connector as claimed in claim 1, wherein the insulating body further comprises locking parts respectively located at two sides of the body.

11. The electrical connector as claimed in claim 10, wherein the shell body further comprises locking elements respectively formed from the bottom rims of the side walls and facing inwards, and the locking elements are locked with the locking parts.

12. The electrical connector as claimed in claim 1, wherein the insulating body further comprises a receiving space in the body, and the receiving space is used for receiving a memory card.

* * * * *